(12) United States Patent
Takeichi

(10) Patent No.: US 6,702,243 B2
(45) Date of Patent: Mar. 9, 2004

(54) CUP HOLDER FOR A VEHICLE

(75) Inventor: Chikashi Takeichi, Toyota (JP)

(73) Assignee: Kojima Press Industry Co., Ltd., Toyota (JP)

( * ) Notice: Subject to any disclaimer, the term of this patent is extended or adjusted under 35 U.S.C. 154(b) by 0 days.

(21) Appl. No.: 10/246,664

(22) Filed: Sep. 19, 2002

(65) Prior Publication Data
US 2003/0057341 A1 Mar. 27, 2003

(30) Foreign Application Priority Data

Sep. 25, 2001 (JP) ........................... 2001-291010
Sep. 11, 2002 (JP) ........................... 2002-265597

(51) Int. Cl.⁷ ................................................. A47K 1/08
(52) U.S. Cl. ..................... 248/311.2; 224/926
(58) Field of Search .................. 248/311.2, 346.06, 248/292.12, 292.13, 222.13; 296/37.12; 224/926, 483

(56) References Cited

U.S. PATENT DOCUMENTS

| | | | |
|---|---|---|---|
| 3,939,986 A | * 2/1976 | Pierro | ........................ 211/74 |
| 5,527,008 A | * 6/1996 | Schutter et al. | .......... 248/311.2 |
| 5,671,877 A | * 9/1997 | Yabuya | ...................... 224/282 |
| 5,800,011 A | * 9/1998 | Spykerman | ............ 297/188.19 |
| 5,876,007 A | * 3/1999 | Lancaster et al. | ........ 248/311.2 |
| 5,897,089 A | * 4/1999 | Lancaster et al. | ........ 248/311.2 |
| 5,988,579 A | * 11/1999 | Moner et al. | ............ 248/311.2 |

FOREIGN PATENT DOCUMENTS

JP          08-238968          9/1996

* cited by examiner

*Primary Examiner*—Korie Chan
*Assistant Examiner*—Ingrid Weinhold
(74) *Attorney, Agent, or Firm*—Pillsbury Winthrop LLP

(57) ABSTRACT

A cup holder for a vehicle includes a holder body, an arm rotatable about a rotation center relative to the holder body in an opening direction and a closing direction, and a positioning mechanism for positioning said arm in at least one rotational position. The positioning mechanism includes a convex tooth and at least one concave portion. The convex tooth includes a first surface facing toward the opening direction of the cup holder, and a second surface facing toward the closing direction of the cup holder. An inclination angle of the first surface and an inclination angle of the second surface are different from each other in magnitude.

8 Claims, 4 Drawing Sheets

CUP HOLDER FOR A VEHICLE

This application is based on and claims priority from Japanese Patent Application No. 2001-291010 filed on Sep. 25, 2001 and Japanese Patent Application No. 2002-265597 filed on Sep. 11, 2002, the content of which is incorporated herein by reference.

BACKGROUND OF THE INVENTION

1. Field of the Invention

The present invention relates to a cup holder for a vehicle.

2. Description of Related Art

As illustrated in FIGS. 6 and 7, a conventional cup holder for a vehicle includes a rotatable arm 1 and a positioning mechanism 2. The positioning mechanism 2 permits rotation of the rotatable arm 1 through a series of retainable positions. The positioning mechanism 2 has at least one horizontally convex tooth and a plurality of horizontally concave portions. The rotatable arm 1 can be positioned stably at a plurality of positions due to the positioning mechanism 2. The rotatable arm 1 is immovable in an up-and-down direction.

The conventional cup holder has the following problems:

At the time of a rush acceleration or deceleration of a vehicle, the rotatable arm 1 may be pushed by a cup C, thus, creating an inertial force from the cup C that causes the rotatable arm 1 to move in a closing direction to release the cup C.

In order to prevent the rotatable arm 1 from releasing the cup C at the time of a rush acceleration or deceleration, it will be effective to increase a load necessary to shift the convex tooth from one concave portion to another concave portion of the positioning mechanism. However, if the load is increased, the force necessary to open the rotatable arm 1 under normal use will become excessive.

SUMMARY OF THE INVENTION

An object of the present invention is to provide a cup holder for a vehicle capable of preventing an arm from releasing a cup when receiving an inertial force from the cup.

A cup holder according to the present invention includes a holder body, an arm rotatable about a rotation center relative to the holder body in an opening direction and a closing direction, and a positioning mechanism for positioning the arm in at least one rotational position. The positioning mechanism includes a convex tooth and at least one concave portion. The convex tooth includes a first surface facing toward the opening direction and a second surface facing toward the closing direction. The first surface has a first angle to the opening direction of the arm, and the second surface has a second angle to the closing direction of the arm. The first angle and the second angle are different from each other in magnitude.

Because the first angle and the second angle are different in magnitude, by selecting the second angle greater than the first angle, the closing load of the arm is greater than the opening load. As a result, the rotatable arm is prevented from releasing a cup when the arm receives an inertial force from the cup C.

BRIEF DESCRIPTION OF THE DRAWINGS

The above and other objects, features, and advantages of the present invention will become apparent and will be more readily appreciated from the following detailed description of the preferred embodiments of the present invention in conjunction with the accompanying drawing, in which.

DETAILED DESCRIPTION OF THE PREFERRED EMBODIMENTS

Figure 1:
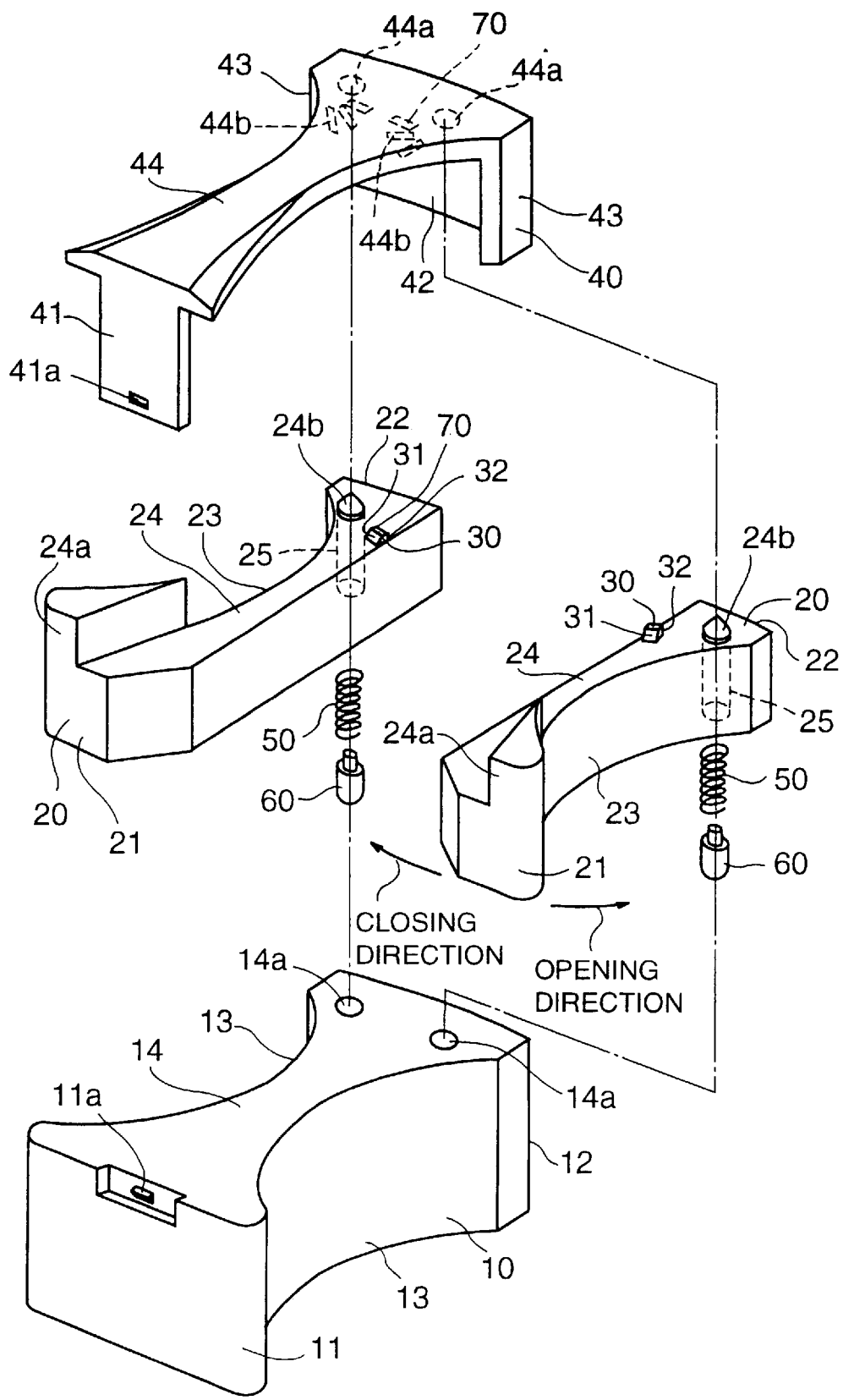
FIG. 1 is an exploded perspective view of elements of a cup holder according to one embodiment of the present invention.

A cup holder for a vehicle according to one embodiment of the present invention will be explained with reference to FIGS. 1–5.

The cup holder according to the present invention can hold at least one cup. The cup holder illustrated in the drawings shows a cup holder capable of holding two cups.

As illustrated in FIG. 1, the cup holder according to the present invention includes a holder body 10 configured to provide support within the cup holder, an arm 20 rotatable relative to the holder body 10 and movable in an up-and-down direction relative to the holder body 10, and a positioning mechanism 70 for positioning the arm 20 in at least one rotational position. The cup holder may further include a plate 40 coupled to the holder body 10, a spring 50, and a shaft pin 60 about which the arm 20 is rotatable.

The holder body 10 may be made from synthetic resin. The holder body 10 supports the arm 20 in cooperation with the plate 40 so that the arm 20 is rotatable. The holder body 10 includes a front wall 11, a rear wall 12, an intermediate wall 13 connecting the front wall 11 and the rear wall 12, and an upper surface 14. The front wall 11 is located closer to a vehicle room than the rear wall 12. An engagement protrusion 11a is formed in the front wall 11. The engagement protrusion 11a engages an engagement hole 41a formed in the plate 40. The intermediate wall 13 has opposite side surfaces which are curved to the form of an arc.

In the rear wall 12 a recess 14a having a vertical axis is formed, and the recess 14a opens at the upper surface 14. The recess 14a has a spherical, concave surface. The recess 14a receives the shaft pin 60 having a spherical surface and rotatably supports the shaft pin 60.

The arm 20 is made from, for example, synthetic resin, but not limited to synthetic resin. The arm 20 holds a cup C at a side surface of the cup when the cup is inserted into the cup holder.

Figure 2:
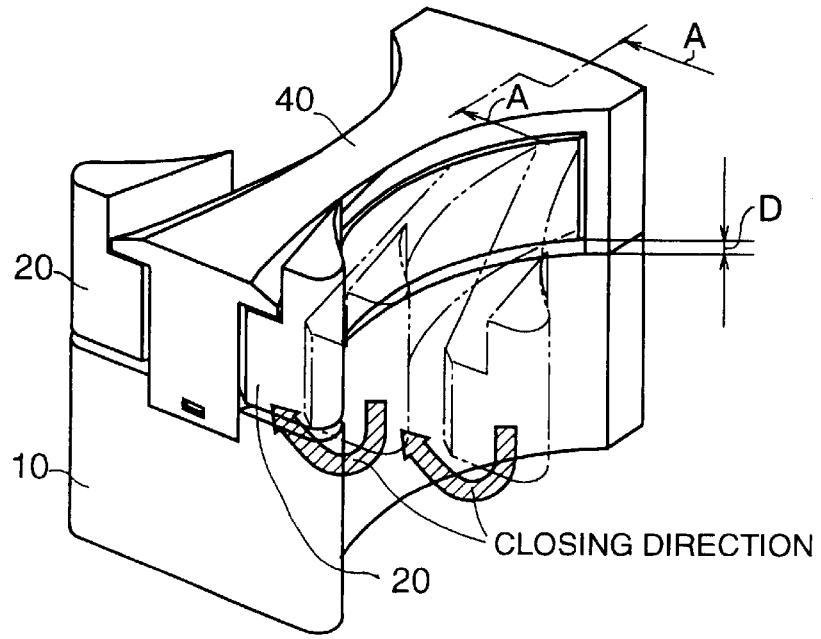
FIG. 2 is a perspective view of an assembly of the elements of the cup holder according to an embodiment of the present invention.
Figure 5:
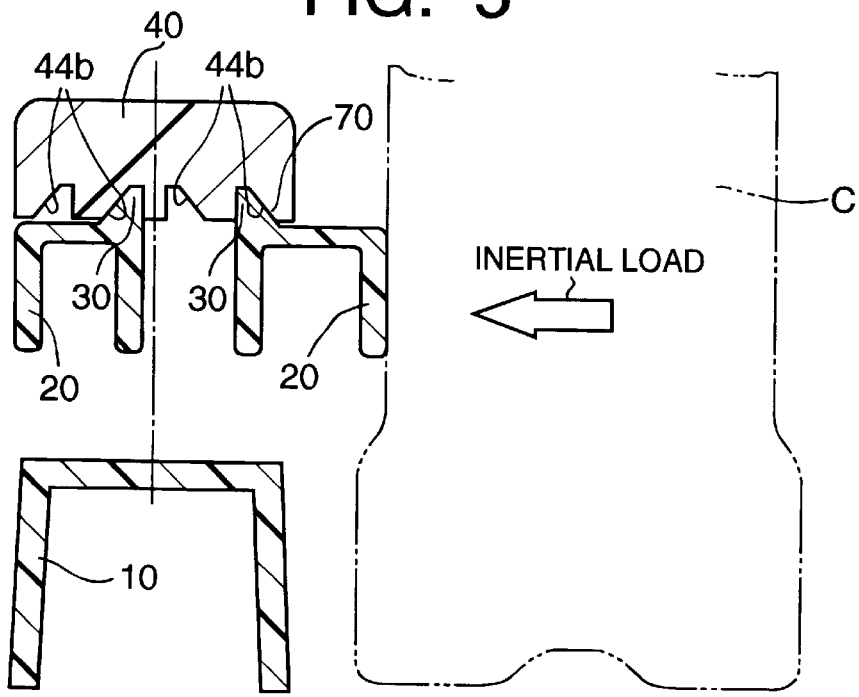
FIG. 5 is a cross-sectional view of a portion of the cup holder, illustrating a relationship between the cup holder and a cup, according to an embodiment of the present invention.
Figure 6:
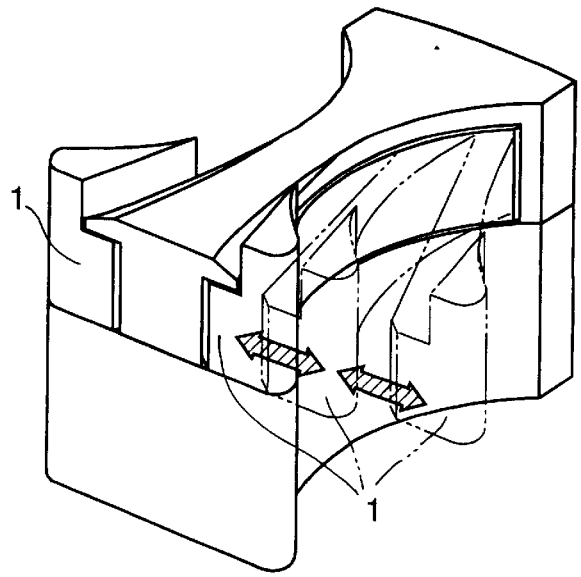
FIG. 6 is a perspective view of a conventional cup holder.
Figure 7:
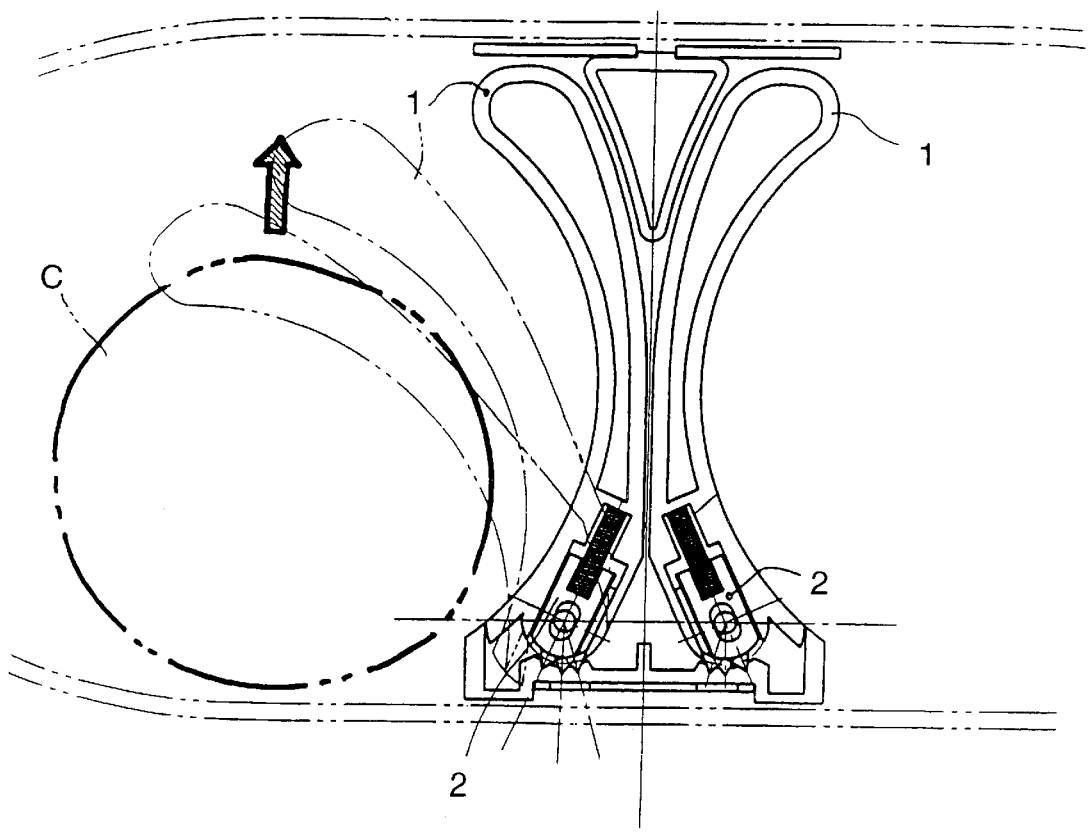
FIG. 7 is a cross-sectional view of the cup holder of FIG. 6.

In FIGS. 2 and 5, the arm 20 is supported by the holder body 10 and the plate 40 so as to be rotatable relative to the holder body 10 in a direction perpendicular to an up-and-down direction. The arm 20 is rotatable about a rotation center of the arm so as to open and close in opening and closing directions, respectively. The opening direction of rotation of the arm 20 corresponds to a direction in which the arm 20 contacts and holds the cup C and the closing direction of rotation of the arm 20 corresponds to a direction in which the arm moves apart from the cup C to release the cup C. The arm 20 biased upward by the spring 50 is movable in the up-and-down direction, too, relative to the holder body 10 and the plate 40 accompanied by an elastic, compression deformation of the spring 50 so that a convex tooth 30 of the positioning mechanism 70 can enter and slip out from a concave portion 44b of the positioning mechanism 70. In FIG. 2, in order to permit the movement of the arm 20 in the up-and-down direction, a gap (D) is provided in the up-and-down direction between a lower surface of the arm 20 and the upper surface 14 of the holder body 10, when the arm 20 is biased upward by the spring 50.

The arm 20 includes a front wall 21, a rear wall 22, and an intermediate wall 23 connecting the front wall 21 and the rear wall 22, and an upper surface 24. The intermediate wall 23 has opposite side surfaces. At least one of the side surfaces is curved to the form of an arc. Both side surfaces may be curved in the form of an arc.

In the upper surface 24 a stopper portion 24a and a protrusion 24b are formed. The stopper portion 24a and the protrusion 24b may be formed integrally with the arm 20, or may be formed separately from the arm 20 and then be fixedly coupled to the arm 20.

The stopper portion 24a protrudes upward from the upper surface 24. The stopper portion 24a is formed in the front wall 21 of the arm 20 or in the intermediate wall 23. The stopper portion 24a is brought into contact with the plate 40 when the arm 20 is rotated in the closing direction, and prevents the arm 20 from rotating further from the contact position.

The protrusion 24b protrudes upward from the upper surface 24 of the arm 20. The protruding amount of the protrusion 24b is equal to or smaller than a protruding amount of the stopper portion 24a. The protrusion 24b is formed in the rear wall 22 of the arm 20 and is located above the recess 14a formed in the holder body 10. The protrusion 24b has a spherical surface or a conical surface reduced in diameter in an upward direction. The protrusion 24b enters a recess 44a formed in the plate 40 and is supported by the plate 40 so as to be rotatable in the recess 44a.

In the arm 20 a cylindrical hole 25 is formed below the protrusion 24b. The cylindrical hole 25 extends in the up-and-down direction. The cylindrical hole 25 is closed at an upper end of the hole 25 and is open at a lower end of the hole 25 at the lower surface of the arm 20.

The positioning mechanism 70 includes a convex tooth 30 and at least one concave portion 44b. The convex tooth 30 of the positioning mechanism 70 protrudes upward from the upper surface 24 of the arm 20. The concave tooth 30 of the positioning mechanism 70 may be formed integrally with the arm 20 or may be formed separately from the arm 20 and then is fixedly coupled to the arm 20. The protruding amount of the convex tooth 30 of the positioning mechanism 70 from the upper surface 24 of the arm 20 is equal to or smaller than the protruding amount of the stopper portion 24a from the upper surface 24 of the arm 20 and the protruding amount of the protrusion 24b from the upper surface 24 of the arm 20. The convex tooth 30 of the positioning mechanism 70 can enter and slip out from the concave portion 44b formed in the plate 40.

Figure 4:
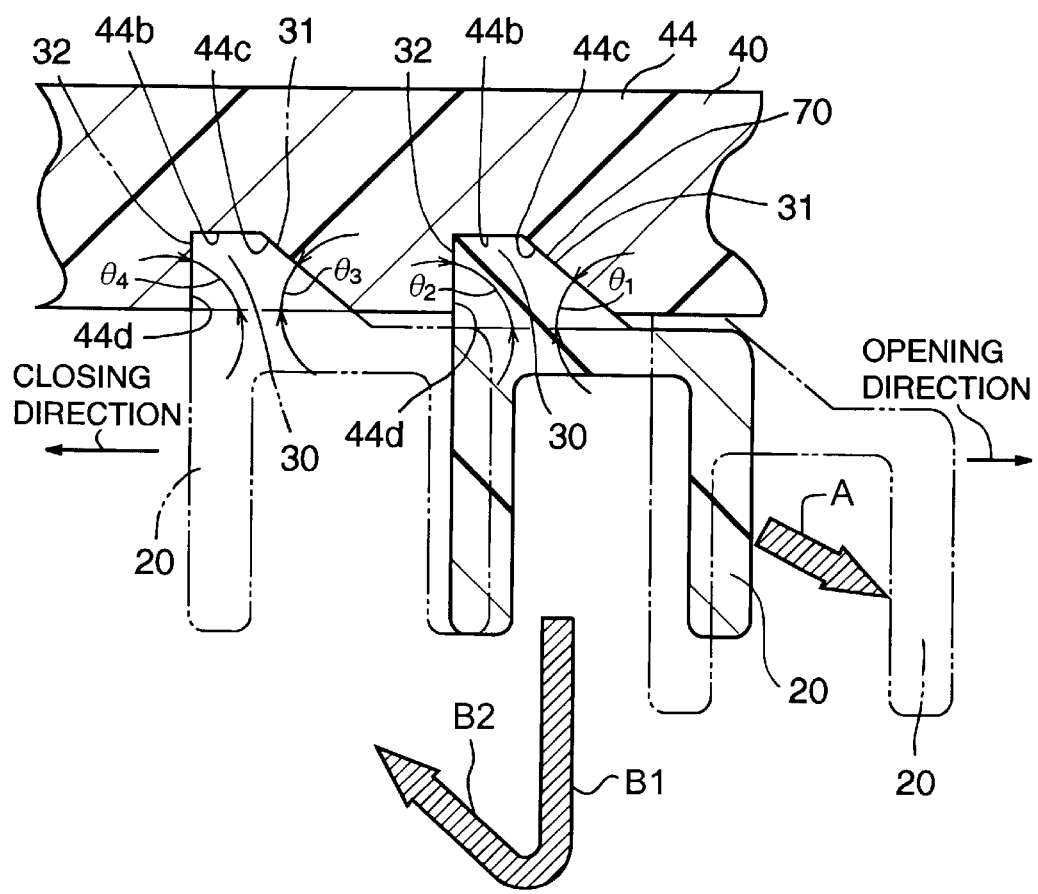
FIG. 4 is an enlarged cross-sectional view of a portion of the cup holder, adjacent to a positioning mechanism of the cup holder, according to an embodiment of the present invention.

In FIG. 4, the convex tooth 30 of the positioning mechanism 70 has a first surface 31 facing toward the opening direction of the arm 20 and a second surface 32 facing toward the closing direction of the arm 20. The first surface 31 has a first angle $\theta_1$ to the opening direction of the arm 20, and the second surface 32 has a second angle $\theta_2$ to the closing direction of the arm 20. The first angle and the second angle are different from each other in magnitude.

In FIG. 1, the first surface 31 is located on a side of the front wall 21 of the arm 20, of the convex tooth 30 of the positioning mechanism 70. The first surface 31 inclines toward the closing direction of the arm 20 in the upward direction from the upper surface 24 by the first angle $\theta_1$. The inclination of the first surface 31 is less steep than the second surface 32.

The second surface 32 is located on a side of the rear wall 22 of the arm 20, of the convex tooth 30 of the positioning mechanism 70. The second surface 32 may be at a right angle to the opening-and-closing direction of the arm 20 or may incline toward the opening direction of the arm 20 in the upward direction from the upper surface 24 by the second angle $\theta_2$. The inclination of the second surface 32 is steeper than the first surface 31, i.e., is closer to a right angle (including that the inclination angle is just a right angle) than the first surface 31 so that when a horizontal force in the closing direction is loaded on the arm 20, the convex tooth 30 and the concave portion 44b are locked to each other to prevent the arm 20 from moving in the closing direction. The case where the inclination angle of the second surface 32 is a right angle is shown in FIG. 4.

The plate 40 may be made from synthetic resin. The plate 40 includes a front wall 41, a rear wall 42, an intermediate wall 43 connecting the front wall 41 and the rear wall 42, and an upper wall 44.

An engagement hole 41a for engaging the engagement protrusion 11a of the holder body 10 is formed in the front wall 41 of the plate 40. The protrusion 11a may be formed in the front wall 41 of the plate 40 and the engagement hole 41 a may be formed in the holder body 10.

In the upper wall 44 of the plate 40, a recess 44a for receiving the protrusion 24b of the arm 20 therein is formed. The recess 44a opens at a lower surface of the upper wall 44 of the plate 40. The recess 44a is formed at a portion of the upper wall 44 adjacent to the rear wall 42. A surface of the recess 44a supports the protrusion 24b of the arm 20 so that the protrusion 24b is rotatable relative to the surface of the recess 44a.

In FIGS. 4 and 5, the plate 40 is an arm-opposed member. In the upper wall 44 of the plate 40, at least one concave portion 44b is formed. The concave portion 44b opens at the lower surface of the upper wall 44 of the plate 40.

The concave portion 44b is formed such that a cup C of a given diameter may be held by the cup holder. In a case where a plurality of concave portions 44b are formed, each of the concave portions 44b is formed on an arc having its arc center at an axis of the recess 44a.

Each concave portion 44b includes a first surface 44c opposed to the first surface 31 of the convex tooth 30 of the positioning mechanism 70 and a second surface 44d opposed to the second surface 32 of the convex tooth 30 of the positioning mechanism 70 when the convex tooth 30 is located in the concave portion 44b.

The first surface 44c of the concave portion 44b has a first angle $\theta_3$ to the opening direction of the arm 20 and the second surface 44d of the concave portion 44b has a second angle $\theta_4$ to the closing direction of the arm 20. The second angle $\theta_4$ of the second surface 44d of the concave portion 44b is closer to a right angle than the first angle of the first surface 44c of the concave portion 44b so that when a horizontal force in the closing direction is applied to the arm 20, the convex tooth 30 and the concave portion 44 are locked to each other to prevent the arm 20 from moving in the closing direction. The second angle $\theta_4$ of the second surface 44d of the concave portion 44b may be a right angle. An illustrated example of the inclination angle of the second surface 32 having a right angle is shown in FIG. 4.

Figure 3:
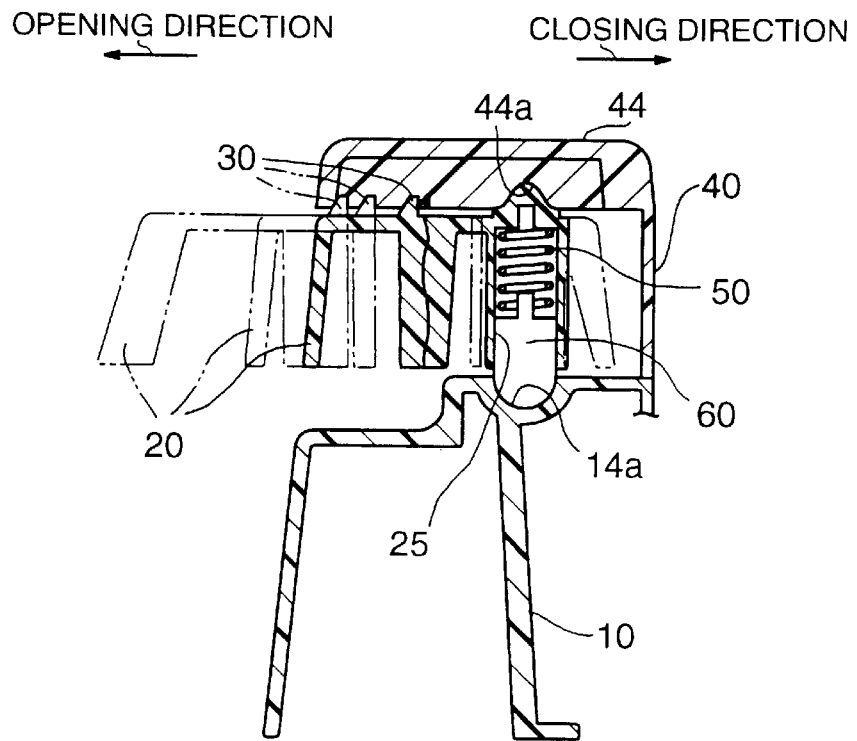
FIG. 3 is a cross-sectional view of the cup holder along A—A of FIG. 2.

In FIG. 3, the spring 50 may be a coil spring. The spring 50 may be inserted into the cylindrical hole 25 formed in the arm 20. The spring biases the arm 40 upward, i.e., toward the plate 40. The spring 50 has a first end contacting the arm 20, i.e., a bottom of the hole 25 and a second, opposite end contacting the shaft pin 60.

The shaft pin 60 may be made from, for example, synthetic resin, metal or ceramics. The shaft pin 60 extends in an up-and-down direction. The shaft pin 60 has an upper end inserted into the cylindrical hole 25 formed in the arm 20. The shaft pin 60 is slidable in the up-and-down direction guided by the cylindrical hole 25. The upper end of the shaft pin 60 contacts the spring 50. The shaft pin 60 has a lower end having a spherical surface and is inserted into the recess 14a formed in the holder body 10. The shaft pin 60 is rotatable in the recess 14a.

Returning to FIG. 1, when the arm 20 is rotated in the opening direction, since the first surface 31 (the surface facing toward the opening direction) of the convex tooth 30 of the positioning mechanism 70 is inclined, the first surface 31 of the convex tooth 30 slips on the first, inclined surface 44c of the concave portion 44b. As a result, the convex tooth 30 of the positioning mechanism 70 can shift from its present concave portion 44b to an adjacent retainable concave portion 44b.

When a horizontal load in the closing direction is applied on the arm 20, since the second surface 32 (the surface facing toward the closing direction) of the convex tooth 30 of the positioning mechanism 70 and the second, tooth-opposed surface 44d of the concave portion 44b are steep in inclination, for example, are at a right angle to the closing direction of the arm 20, the convex tooth 30 and the concave portion 44b are locked to each other so that the arm 20 is prevented from being rotated in the closing direction. As a result, even if an inertial force is applied to the cup C at the time of rush acceleration or deceleration of the vehicle and the arm 20 is pushed horizontally by the cup C, the arm 20 will be prevented from moving in the closing direction and will continue to hold the cup C upright.

In a case where the arm 20 is required to be rotated in the closing direction by hand, the arm 20 may be pushed downward by hand against the biasing force of the spring 50. When the arm 20 is lowered, the second surface 32 of the convex tooth 30 may be disengaged from the second surface 44d of the concave portion 44b in the closing direction, and therefore, the arm 20 can be rotated freely in the closing direction until the arm 20 is brought into contact with the stopper portion 24a.

Based upon the above described invention, the following technical advantages are obtained:

Since the first surface (the surface facing toward the opening direction) and the second surface (the surface facing toward the closing direction) of the convex tooth of the positioning mechanism have different inclination angles with respect to the opening and closing direction of the cup holder, by making the inclination of the second surface steeper than that of the first surface, a load required to close the arm can be greater than a load required to open the arm.

As a result, even if an excessively large load acts on the arm from the cup at the time of a rush acceleration or deceleration, the arm can continue to hold the cup upright, without making the opening load of the arm heavy.

In the case where the arm may be rotated manually, the arm may be lowered and then rotated in the closing direction. The arm can be rotated freely in the closing direction.

Although in the above embodiment of the invention, the convex tooth 30 of the positioning mechanism 70 is formed in the arm 20 and the concave portion 44b is formed in the arm opposed-member (i.e., the plate 40), the convex tooth 30 may be formed in the arm-opposed member and the concave portion 44b may be formed in the arm.

Further, the at least one concave portion 44b may be a groove or a root of a thread formed in the arm-opposed member or the arm.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A cup holder for a vehicle, comprising:
    a holder body configured to provide support within the cup holder;
    an arm rotatable about a rotation center relative to said holder body in an opening direction and a closing direction; and
    a positioning mechanism for positioning said arm in at least one rotational position, said positioning mechanism including a convex tooth and at least one concave portion, said convex tooth including a first surface facing toward said opening direction and a second surface facing toward said closing direction,
    wherein said first surface has a first angle measured from a plane formed by said rotating movement of said arm through said tooth to said first surface, and said second surface has a second angle measured from the plane formed by said rotating movement of said arm through said tooth to said second surface, said first angle and said second angle being different from each other in magnitude; and
    said arm is movable in an up-and-down direction relative to said holder body by such an amount as said convex tooth disengages from said concave portion.

2. The cup holder according to claim 1, wherein an inclination of said second surface is steeper than an inclination of said first surface.

3. The cup holder according to claim 1, wherein said second angle of said second surface is a right angle.

4. The cup holder according to claim 1, further comprising an arm-opposed member, wherein said convex tooth is formed in one of said arm and said arm-opposed member and said at least one concave portion is formed in the other of said arm and said arm-opposed member.

5. The cup holder according to claim 1, wherein said at least one concave portion includes a first surface opposed to said first surface of said convex tooth and a second surface opposed to said second surface of said convex tooth when said convex tooth is located in said at least one concave portion, said first surface of said at least one concave portion having a first angle measured from a plane formed by said rotating movement of said arm through said concave portion to said first surface and said second surface of said at least one concave portion having a second angle measured from the plane formed by said rotating movement of said arm through said concave portion to said second surface, said second angle of said second surface of said at least one concave portion being closer to a right angle than said first angle of said first surface of said at least one concave portion.

6. The cup holder according to claim 5, wherein said second angle of said second surface of said at least one concave portion is a right angle.

7. The cup holder according to claim 4, wherein said arm-opposed member is a plate having an upper wall above said arm, wherein said arm has an upper surface and said upper wall of said plate has a lower surface opposed to said upper surface of said arm, said convex tooth being formed in said arm and being convex upwards from said upper surface of said arm, said at least one concave portion being formed in said plate and being concave upwards from said lower surface of said upper wall of said plate.

8. The cup holder according to claim 1, wherein said convex tooth and said at least one concave portion are located on an arc having its arc center at said rotation center of said arm.

* * * * *